United States Patent
Nakamura

(10) Patent No.: US 10,106,455 B2
(45) Date of Patent: Oct. 23, 2018

(54) NEAR INFRARED ABSORBING GLASS

(71) Applicant: NIPPON ELECTRIC GLASS CO., LTD., Otsu-shi, Shiga (JP)

(72) Inventor: Masashi Nakamura, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 6 days.

(21) Appl. No.: 15/544,049

(22) PCT Filed: Mar. 29, 2016

(86) PCT No.: PCT/JP2016/060024
§ 371 (c)(1),
(2) Date: Jul. 17, 2017

(87) PCT Pub. No.: WO2016/163270
PCT Pub. Date: Oct. 13, 2016

(65) Prior Publication Data
US 2018/0002219 A1   Jan. 4, 2018

(30) Foreign Application Priority Data

Apr. 10, 2015 (JP) ................................ 2015-080767

(51) Int. Cl.
C03C 3/17 (2006.01)
C03C 4/08 (2006.01)
G02B 5/20 (2006.01)
G02B 5/22 (2006.01)

(52) U.S. Cl.
CPC ............... *C03C 3/17* (2013.01); *C03C 4/082* (2013.01); *G02B 5/208* (2013.01); *G02B 5/226* (2013.01)

(58) Field of Classification Search
USPC ......................................................... 252/587
See application file for complete search history.

(56) References Cited

U.S. PATENT DOCUMENTS

| 9,388,069 B2 * | 7/2016 | Schreder .................. C03C 4/02 |
| 2013/0105744 A1 * | 5/2013 | Ogawa .................... C03B 32/00 |
| | | 252/587 |
| 2013/0344343 A1 | 12/2013 | Schreder et al. |

FOREIGN PATENT DOCUMENTS

| JP | 11-268927 A | | 10/1999 |
| JP | 2006-001808 A | | 1/2006 |
| JP | 2011-121792 | * | 6/2011 |
| JP | 2011-121792 A | | 6/2011 |
| JP | 2011-168455 A | | 9/2011 |
| JP | 2014-12630 A | | 1/2014 |
| JP | 2015-089855 A | | 5/2015 |

OTHER PUBLICATIONS

Official Communication issued in International Patent Application No. PCT/JP2016/060024, dated Jun. 7, 2016.

* cited by examiner

*Primary Examiner* — Monique R Peets
(74) *Attorney, Agent, or Firm* — Keating and Bennett, LLP

(57) ABSTRACT

Provided is a near infrared absorbing glass excellent in each of weather resistance, resistance to denitrification, and optical properties even if not containing fluorine. A near infrared absorbing glass containing, in % by mass, 25 to 60% $P_2O_5$, 2 to 19% $Al_2O_3$, 10 to 45% RO (where R is at least one selected from Mg, Ca, Sr, and Ba), 0 to 13% ZnO, 12% to 20% (exclusive of 12% and 20%) $K_2O$, 0 to 12% $Na_2O$, and 0.3 to 20% CuO.

2 Claims, 1 Drawing Sheet

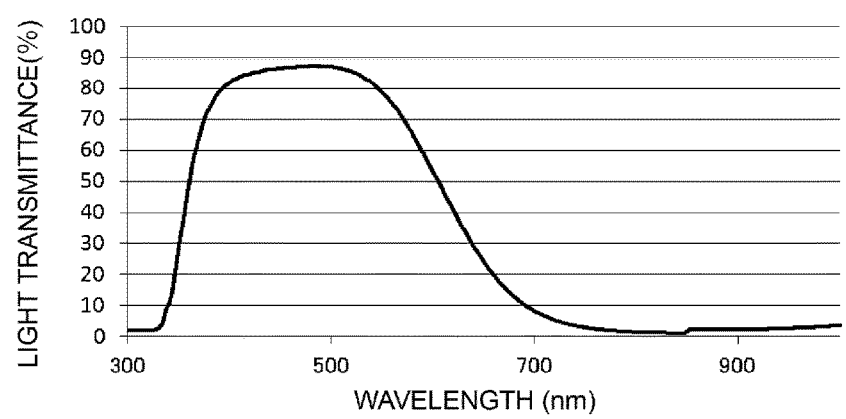

NEAR INFRARED ABSORBING GLASS

TECHNICAL FIELD

The present invention relates to near infrared absorbing glasses capable of selectively absorbing near infrared rays.

BACKGROUND ART

Generally, near infrared absorbing glass is used in camera sections in optical devices of digital cameras, smartphones, and so on in order to compensate for the spectral sensitivity of their solid-state imaging devices, such as CCDs or CMOSs. For example, Patent Literature 1 discloses a fluorine-containing phosphate-based near infrared absorbing glass. Fluorine is highly effective in increasing weather resistance and, therefore, the near infrared absorbing glass disclosed in Patent Literature 1 has excellent weather resistance.

CITATION LIST

Patent Literature

[PTL 1]
JP-A-2014-12630

SUMMARY OF INVENTION

Technical Problem

The fluorine component of glass is a substance of environmental concern and, therefore, its use is recently being restricted. However, if the glass contains no fluorine component, it is difficult to increase the weather resistance. Furthermore, if an attempt is made to improve the weather resistance, inconveniences are likely to occur, such as reduction in resistance to devitrification and optical properties.

In view of the foregoing, the present invention is aimed at providing a near infrared absorbing glass excellent in each of weather resistance, resistance to devitrification, and optical properties even if not containing fluorine.

Solution to Problem

A near infrared absorbing glass according to the present invention contains, in % by mass, 25 to 60% $P_2O_5$, 2 to 19% $Al_2O_3$, 10 to 45% RO (where R is at least one selected from Mg, Ca, Sr, and Ba), 0 to 13% ZnO, 12% to 20% (exclusive of 20%) $K_2O$, 0 to 12% $Na_2O$, and 0.3 to 20% CuO.

In the near infrared absorbing glass according to the present invention, $P_2O_5$/RO is preferably 1.0 to 1.9.

The near infrared absorbing glass according to the present invention is preferably free of fluorine component.

The near infrared absorbing glass according to the present invention preferably has a thickness of 0.01 to 1.2 mm.

With this structure, the optical device can be reduced in thickness and weight.

Advantageous Effects of Invention

The present invention enables provision of a near infrared absorbing glass excellent in each of weather resistance, resistance to denitrification, and optical properties even if not containing fluorine.

BRIEF DESCRIPTION OF DRAWINGS

FIG. 1 is a graph representing a light transmittance curve of a sample in Example 1.

DESCRIPTION OF EMBODIMENTS

A near infrared absorbing glass according to the present invention contains, in % by mass, 25 to 60% $P_2O_5$, 2 to 19% $Al_2O_3$, 10 to 45% RO (where R is at least one selected from Mg, Ca, Sr, and Ba), 0 to 13% ZnO, 12% to 20% (exclusive of 20%) $K_2O$, 0 to 12% $Na_2O$, and 0.3 to 20% CuO. The reasons why the content range of each component is limited as just described will be described below. In the following description of the components, "%" refers to "% by mass".

$P_2O_5$ is a component essential for forming the glass network. The $P_2O_5$ content is 25 to 60%, preferably 30 to 55%, and particularly preferably 40 to 50%. If the $P_2O_5$ content is too small, vitrification is liable to be unstable. On the other hand, if the $P_2O_5$ content is too large, the weather resistance is likely to decrease.

$Al_2O_3$ is a component for significantly increasing the weather resistance. The $Al_2O_3$ content is 2 to 19%, preferably 2 to 15%, more preferably 2.8 to 7.5%, and particularly preferably 3.5 to 6.8%. If the $Al_2O_3$ content is too small, the above effect is less likely to be obtained. On the other hand, if the $Al_2O_3$ content is too large, the meltability is liable to decrease to raise the melting temperature. Note that if the melting temperature rises, Cu ions are reduced, so that a shift from $Cu^{2+}$ to $Cu^+$ is likely to occur, which makes it difficult to provide desired optical properties. Specifically, the light transmittance in the near-ultraviolet to visible regions is likely to decrease or the near infrared ray absorbing property is likely to decrease.

RO (where R is at least one selected from Mg, Ca, Sr, and Ba) is a component for improving the weather resistance and increasing the meltability. The RO content is, in total, 10 to 45%, preferably 15 to 40%, and particularly preferably 20 to 35%. If the RO content is too small, the above effects are less likely to be obtained. On the other hand, if the RO content is too large, the glass stability is likely to decrease, thus precipitating crystals derived from the RO component.

Note that the preferred content ranges of the individual RO components are as follows.

MgO is a component for improving the weather resistance. The MgO content is preferably 0 to 15% and particularly preferably 0.4 to 7.0%. If the MgO content is too large, the glass stability is likely to decrease.

CaO is, like MgO, a component for improving the weather resistance. The CaO content is preferably 0 to 15% and particularly preferably 0.4 to 7%. If the CaO content is too large, the glass stability is likely to decrease.

SrO is also, like MgO, a component for improving the weather resistance. The SrO content is preferably 0 to 12% and particularly preferably 0.3 to 5%. If the SrO content is too large, the glass stability is likely to decrease.

BaO is a component for stabilizing glass and increasing the weather resistance. The BaO content is preferably 5 to 30%, more preferably 7 to 25%, and particularly preferably 7.2 to 23%. If the BaO content is too small, the above effects are less likely to be obtained. On the other hand, if the BaO content is too large, crystals derived from BaO are likely to precipitate during molding.

ZnO is a component for improving the stability and weather resistance of glass. The ZnO content is 0 to 13%, preferably 0.1 to 12%, and particularly preferably 1 to 10%. If the ZnO content is too large, the meltability is likely to decrease to raise the melting temperature, resulting in difficulty in providing desired optical properties. In addition, the glass stability is likely to decrease, thus precipitating crystals derived from the ZnO component.

As thus far described, RO and ZnO have the effect of improving the stabilization of glass and the effect is likely to be brought out particularly when the $P_2O_5$ content is small.

$P_2O_5$/RO is preferably 1.0 to 1.9 and particularly preferably 1.2 to 1.8. If $P_2O_5$/RO is too small, the liquidus temperature is likely to increase to cause denitrification due to RO. On the other hand, if $P_2O_5$/RO is too large, the weather resistance is likely to decrease.

$K_2O$ is a component for decreasing the melting temperature. The $K_2O$ content is 12 to 20% (exclusive of 20%) and preferably 12.5 to 19.5%. If the $K_2O$ content is too small, the melting temperature is likely to increase, thus making it difficult to provide desired optical properties. On the other hand, if the $K_2O$ content is too large, crystals derived from $K_2O$ are likely to precipitate during molding, so that vitrification is liable to be unstable.

$Na_2O$ is, like $K_2O$, a component for decreasing the melting temperature. The $Na_2O$ content is 0 to 12% and particularly preferably 0.1 to 7%. If the $Na_2O$ content is too large, vitrification is likely to be unstable.

CuO is an essential component for absorbing near infrared rays. The CuO content is 0.3 to 20%, preferably 0.3 to 15%, and particularly preferably 0.4 to 13. If the CuO content is too small, a desired near infrared ray absorbing property is less likely to be obtained. On the other hand, if the CuO content is too large, the light transmittance in the ultraviolet to visible regions is likely to decrease. In addition, vitrification is liable to be unstable. Note that in order to obtain desired optical properties, the CuO content is preferably appropriately adjusted according to the thickness. For example, when the glass thickness is about 0.9 to 1.2 mm, the CuO content is preferably 0.4 to 3%. When the glass thickness is about 0.2 to 0.5 mm, the CuO content is preferably 3.5 to 7%.

In addition to the above components, $B_2O_3$, $Nb_2O_5$, $Y_2O_3$, $La_2O_3$, $Ta_2O_5$, $CeO_2$, $Sb_2O_3$, and so on may be incorporated into the glass without impairing the effects of the present invention. Specifically, the content of each of these components is preferably 0 to 3% and particularly preferably 0 to 2%.

The near infrared absorbing glass according to the present invention is normally used in the form of a sheet. The thickness is preferably 0.01 to 1.2 mm and particularly preferably 0.05 to 1.2 mm. If the thickness is too small, the mechanical strength is liable to be poor. On the other hand, if the thickness is too large, the thickness reduction of the optical device is liable to be difficult.

Since the near infrared absorbing glass according to the present invention has the above composition, this enables the achievement of both of a high light transmittance in the visible region and an excellent light absorbing property in the near infrared region. Specifically, the light transmittance at a wavelength of 400 nm is preferably 78% or more and particularly preferably 80% or more and the light transmittance at a wavelength of 500 nm is preferably 83% or more and particularly preferably 85% or more. On the other hand, the light transmittance at a wavelength of 700 nm is preferably 12% or less and particularly preferably 9% or less and the light transmittance at a wavelength of 800 nm is preferably 5% or less and particularly preferably 3% or less.

The liquidus temperature of the near infrared absorbing glass according to the present invention is preferably 770° C. or less and particularly preferably 750° C. or less. If the liquidus temperature is too high, devitrification is likely to occur during molding.

The near infrared absorbing glass according to the present invention can be manufactured by melting a batch of raw material powder prepared to have a desired composition and molding the melt. The melting temperature is preferably 900 to 1200° C. and particularly preferably 900 to 1000° C. If the melting temperature is too low, homogeneous glass is less likely to be obtained. On the other hand, if the melting temperature is too high, Cu ions are reduced, so that a shift from $Cu^{2+}$ to $Cu^+$ is likely to occur, which makes it difficult to provide desired optical properties.

Thereafter, the molten glass is molded into a predetermined shape and subjected to necessary post-processing. The resultant glass can be served for various applications. Note that in order to efficiently manufacture a near infrared absorbing glass with a small thickness, it is preferred to adopt a down-draw process, a redraw process or like molding processes. Because these molding processes are likely to involve devitrification, an effect of excellent resistance to denitrification of the near infrared absorbing glass according to the present invention is likely to be brought out by the use of these molding processes.

EXAMPLES

Hereinafter, the near infrared absorbing glass according to the present invention will be described in detail with reference to examples, but the present invention is not limited to these examples.

Tables 1 and 2 show Examples 1 to 11 of the present invention and Table 3 shows Comparative Examples 1 to 6 for the present invention.

TABLE 1

| (% by mass) | Ex. 1 | Ex. 2 | Ex. 3 | Ex. 4 | Ex. 5 | Ex. 6 |
|---|---|---|---|---|---|---|
| $P_2O_5$ | 48.0 | 48.0 | 48.0 | 49.3 | 49.3 | 49.3 |
| $Al_2O_3$ | 6.3 | 6.3 | 4.3 | 6.5 | 6.5 | 6.5 |
| MgO | 2.7 | 2.7 | 3.7 | 2.8 | 2.8 | 2.8 |
| CaO | 3.7 | 3.7 | 5.2 | 3.8 | 3.8 | 3.8 |
| BaO | 20.4 | 23 | 18 | 21 | 23.5 | 19.5 |
| ZnO | | | | | | |
| $Na_2O$ | | | | | | |
| $K_2O$ | 15.1 | 12.5 | 17.0 | 15.5 | 13.0 | 17.0 |
| CuO | 3.8 | 3.8 | 3.8 | 1.1 | 1.1 | 1.1 |
| $P_2O_5$/RO | 1.79 | 1.63 | 1.78 | 1.79 | 1.64 | 1.89 |
| Thickness (mm) | 0.3 | 0.3 | 0.3 | 1.2 | 1.2 | 1.2 |
| Light Transmittance | ○ | ○ | ○ | ○ | ○ | ○ |
| Weather Resistance | ○ | ○ | ○ | ○ | ○ | ○ |
| Liquidus Temperature (° C.) | 720 | 730 | 720 | 720 | 690 | 730 |

TABLE 2

| (% by mass) | Ex. 7 | Ex. 8 | Ex. 9 | Ex. 10 | Ex. 11 |
|---|---|---|---|---|---|
| $P_2O_5$ | 54.0 | 35.0 | 48.0 | 48.0 | 45.0 |
| $Al_2O_3$ | 3.0 | 3.0 | 6.3 | 6.3 | 3.0 |
| MgO | 3.0 | 2.0 | 2.7 | 2.7 | 6.0 |
| CaO | 9.6 | 5.0 | 3.7 | 3.7 | 9.5 |
| BaO | 16.8 | 25.0 | 20.4 | 20.4 | 19.0 |
| ZnO | | 9.0 | 2.6 | | |
| $Na_2O$ | | | | 2.1 | 4.2 |
| $K_2O$ | 12.5 | 17.0 | 12.5 | 13.0 | 12.2 |

TABLE 2-continued

| (% by mass) | Ex. 7 | Ex. 8 | Ex. 9 | Ex. 10 | Ex. 11 |
|---|---|---|---|---|---|
| CuO | 1.1 | 4.0 | 3.8 | 3.8 | 1.1 |
| P$_2$O$_5$/RO | 1.84 | 1.09 | 1.79 | 1.79 | 1.30 |
| Thickness(mm) | 1.2 | 0.3 | 0.3 | 0.3 | 1.2 |
| Light Transmittance | ○ | ○ | ○ | ○ | ○ |
| Weather Resistance | ○ | ○ | ○ | ○ | ○ |
| Liquidus Temperature (° C.) | 690 | 760 | 730 | 720 | 740 |

TABLE 3

| (% by mass) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| P$_2$O$_5$ | 48.0 | 48.0 | 49.3 | 49.3 | 40.5 | 42.0 |
| Al$_2$O$_3$ | 6.3 | 6.3 | 6.5 | 6.5 | 1.5 | 2.0 |
| MgO | 2.7 | 2.7 | 2.8 | 2.8 | 4.0 | 4.0 |
| CaO | 3.7 | 3.7 | 3.8 | 3.8 | 10.0 | 5.0 |
| BaO | 24.5 | 13.5 | 26.5 | 13.5 | 28.9 | 17.0 |
| ZnO | | | | | | 14.0 |
| Na$_2$O | | | | | | |
| K$_2$O | 11.0 | 22.0 | 10.0 | 23.0 | 14.0 | 12.5 |
| CuO | 3.8 | 3.8 | 1.1 | 1.1 | 1.1 | 3.5 |
| P$_2$O$_5$/RO | 1.55 | 2.41 | 1.49 | 2.45 | 0.94 | 1.62 |
| Thickness (mm) | 0.3 | 0.3 | 1.2 | 1.2 | 1.2 | 0.3 |
| Light Transmission Property | X | ○ | X | ○ | ○ | ○ |
| Weather Resistance | ○ | X | ○ | X | X | ○ |
| Liquidus Temperature (° C.) | 770 | 660 | 770 | 670 | 900 | 850 |

(1) Production of Samples

First, each of sets of glass raw materials prepared to have the compositions in Tables 1 to 3 was loaded into a platinum crucible and melted at temperatures of 1000 to 1200° C. Next, the molten glass was allowed to flow on a carbon plate and cooled to become solidified. Thereafter, the product was annealed to obtain a sample.

(2) Evaluation of Samples

Each of the obtained samples was measured or evaluated in terms of light transmission property, weather resistance, and liquidus temperature in the following manners. The results are shown in Tables 1 to 3. Furthermore, a light transmittance curve of a sample in Example 1 is shown in FIG. 1.

As for the light transmission property, each of the samples subjected at both sides to mirror polishing and having respective thicknesses shown in the tables was measured in terms of light transmittance in a range of 300 to 1500 nm using U-4100 manufactured by Hitachi, Ltd. Samples whose light transmittances meet all the following criteria were evaluated to be good "open circle" and samples whose light transmittances do not meet any one of the following criteria were evaluated to be no good "cross".

(Criteria for Light Transmittance)

Light transmittance at wavelength of 400 nm≥78%
Light transmittance at wavelength of 500 nm≥83%
Light transmittance at wavelength of 700 nm≤12%
Light transmittance at wavelength of 800 nm≤5%

As for the weather resistance, each of the samples subjected at both sides to mirror polishing was held for 24 hours under conditions at a temperature of 120° C. and a relative humidity of 100% and then determined in terms of weather resistance based on whether or not to have changed in appearance. Specifically, samples found not to have changed in appearance after the test were evaluated to be good "open circle" and samples found to have changed in appearance, such as white tarnish, were evaluated to be no good "cross".

The liquidus temperature was determined in the following manner. Each sample crushed to have a particle size of 300 to 600 μm was put into a platinum container and held in a temperature-gradient furnace for 24 hours. A minimum temperature at which interfacial crystals precipitated at the bottom of the platinum container was defined as an "interfacial crystal precipitation temperature" and a minimum temperature at which crystals precipitated 2 mm from the bottom of the platinum container was defined as an "internal crystal precipitation temperature". The lower of the "interfacial crystal precipitation temperature" and the "internal crystal precipitation temperature" was defined as the liquidus temperature. Note that when the liquidus temperature is 770° C. or less, the resistance to denitrification can be determined to be good.

As seen from Tables 1 and 2 and FIG. 1, the samples in Examples 1 to 11 had high light transmittances in the visible region and exhibited high absorption in the near-infrared region. Furthermore, the above samples were found to have no change between before and after the test in terms of the evaluation of weather resistance and had liquidus temperatures of not more than 760° C., showing that the samples were excellent in resistance to denitrification.

In contrast, as seen from Table 3, the samples in Comparative Examples 1 and 3 were poor in light transmittance, the samples in Comparative Examples 2, 4, and 5 were poor in weather resistance, and the samples in Comparative Examples 5 and 6 exhibited liquidus temperatures of not less than 850° C. and were therefore poor in resistance to denitrification.

The invention claimed is:

1. A near infrared absorbing glass containing, in % by mass, 25 to 60% P$_2$O$_5$, 2 to 19% Al$_2$O$_3$, 10 to 45% RO (where R is at least one selected from Mg, Ca, Sr, and Ba), 0 to 13% ZnO, 12% to 20% (exclusive of 12% and 20%) K$_2$O, 0 to 12% Na$_2$O, and 0.3 to 20% CuO, and being free of a fluorine component; wherein
P$_2$O$_5$/RO is 1.0 to 1.9.

2. The near infrared absorbing glass according to claim 1, having a thickness of 0.01 to 1.2 mm.

\* \* \* \* \*